June 5, 1962 R. D. VEITEL ETAL 3,037,633
STRAINER
Filed Jan. 4, 1961 2 Sheets-Sheet 1

Inventors
Robert D. Veitel
Vernon J. Palmer
By [signature]
Attorney

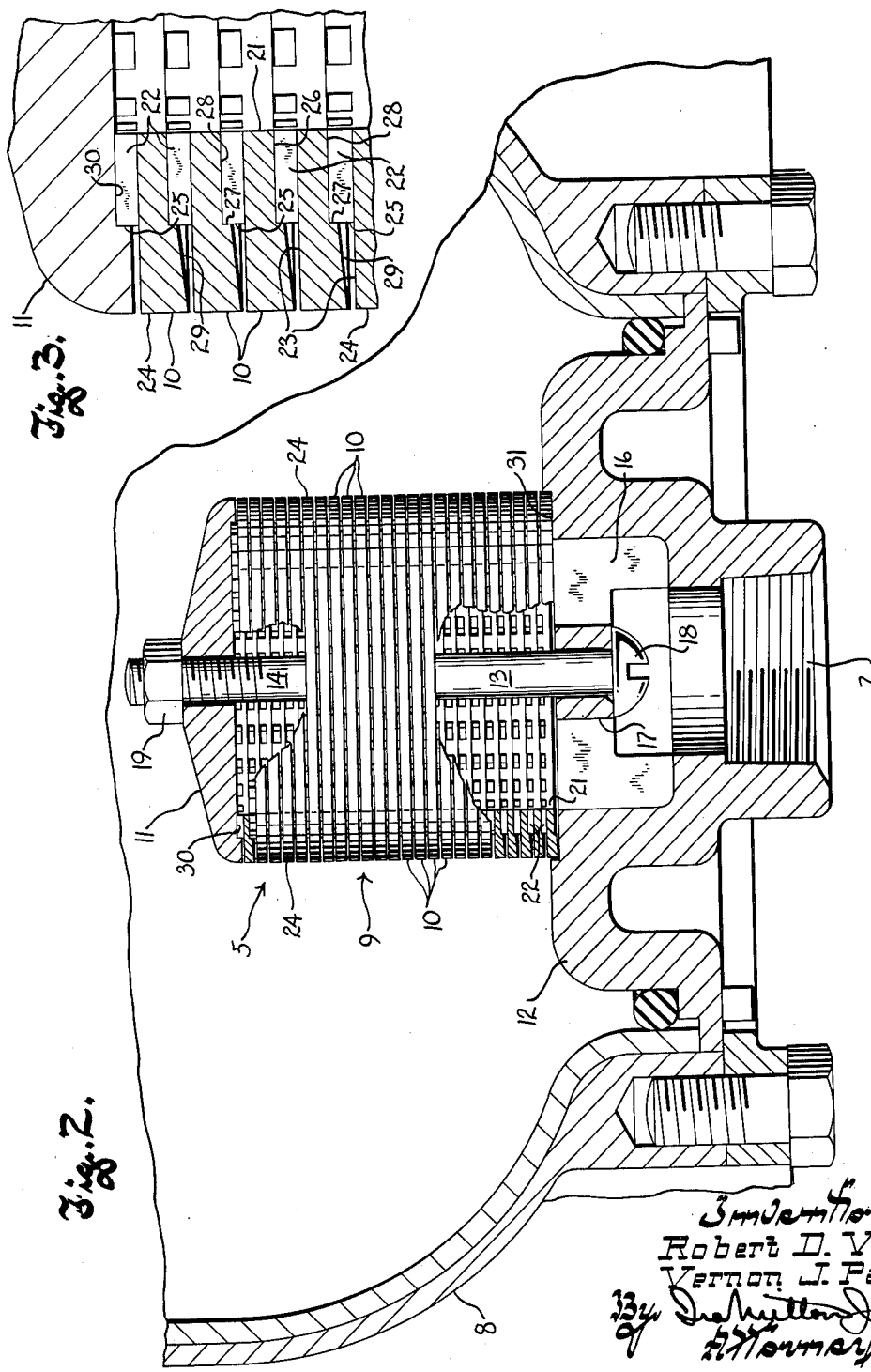

United States Patent Office 3,037,633
Patented June 5, 1962

3,037,633
STRAINER
Robert D. Veitel and Vernon J. Palmer, Milwaukee, Wis., assignors to Bruner Corporation, Milwaukee, Wis., a corporation of Wisconsin
Filed Jan. 4, 1961, Ser. No. 80,577
1 Claim. (Cl. 210—232)

This invention relates to strainers, and has more particular reference to strainer units of the type which are especially well suited for installation in ports of water softener tanks, or the like, to function not only as a distributor for incoming liquid, but to also act as a strainer to prevent the ion exchange granules from being carried out of the tank along with liquid discharging therefrom.

Conventional disc-type strainers usually comprise a stack of identical, slightly spaced apart discs defining a hollow strainer body and confined between opposite end members. These discs usually have central hubs connected by spokes to the rims of the discs, and a bolt passing through the hubs of the discs and connecting the end members not only held the stack clamped between the end members, but also held the discs against flatwise shifting out of coaxial relation with respect to one another. One of the end members usually was provided with a hole therethrough defining a port which communicated with the interior of the strainer body, and the slight spaces between discs collectively defined another port which was in communication with the hollow interior of the filter body and opened radially to its exterior.

With this construction, fluid can flow in either direction through the strainer unit. For example, when such strainers are installed in a water softener tank with the tank ports leading axially into the strainer body, incoming fluid introduced into the hollow interior of the body is constrained to flow radially outwardly through the small spaces between adjacent strainer discs, and the unit acts as a distributor to cause discharge of fluid from the strainer body over a substantially great area. Fluid discharging from the other port of the softener tank, however, must flow radially inwardly through the slight spaces between adjacent strainer discs, and the unit then serves as a strainer to prevent loss of the tiny granules of ion exchange material from the softener tank.

In general, it may be said that the strainer unit of this invention departs from the conventional in that its hollow body is comprised of a stack of thin rings, all portions of which are spaced from and clear the bolt which passes centrally through the body and connects the end members of the strainer unit to hold the stack of rings clamped between them. In this respect, it is a purpose of this invention to provide a strainer unit of the character described wherein the rings cooperate with one another to hold themselves in coaxial relation, and have interlocking engagement with the end members of the unit so that the entire stack of rings will be held coaxial with respect to the bolt which passes axially through the center of the stack of rings and connects the end members of the unit, without need for engagement of any portion of the rings with said bolt.

More specifically, it is a purpose of this invention to provide a strainer unit wherein a stack of identical rings provides a hollow strainer body that is clamped between end members at opposite ends of the body, and wherein each ring has circumferentially equispaced pads formed on and projecting from one face thereof, and a recess in its opposite face in which the pads of an adjacent ring bottom to hold the rings slightly spaced apart and against flatwise shifting out of coaxial relation, but without interfering with rotation of the rings relative to one another and to the end members at the opposite ends of the stack of rings.

With these and other objects in view which will appear as the description proceeds, this invention resides in the novel construction, combination and arrangement of parts substantially as hereinafter described and more particularly defined by the appended claims, it being understood that such changes in the precise embodiments of the hereindisclosed invention may be made as come within the scope of the claims.

The accompanying drawings illustrate two complete examples of the physical embodiments of the invention constructed according to the best modes so far devised for the practical application of the principles thereof, and in which:

FIGURE 2 is an enlarged sectional view of the bottom strainer unit shown in FIGURE 1, portions of the rings which collectively define the cylindrical side wall of the unit being broken away and shown in section;

FIGURE 3 is a further enlarged fragmentary sectional view through an upper corner portion of the strainer unit shown in FIGURE 2;

Figure 1:
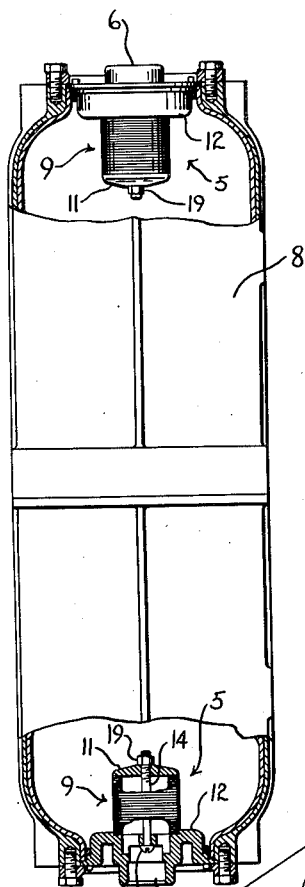
FIGURE 1 is a view of a water softener tank having end portions of its side walls broken away to show strainers of this invention connected in both the top and bottom ports of the tank.

Referring now more particularly to the accompanying drawings, a strainer unit 5 of this invention has been shown connected in each of the top and bottom ports 6 and 7, respectively, at the ends of a water softener tank 8. It will be understood, however, that this use of the strainer of this invention is for purposes of illustration only, and while it is particularly well suited for use in water softener tanks, it may have utility in many other environments.

Either of the strainer units 5 is adapted to serve as a distributor for liquid entering the tank, while the other one acts as a strainer for liquid discharging from the tank. In a water softener tank, of course, water may enter the tank from either end thereof, depending upon whether the water softener is in service condition or being regenerated. In either instance, of course, one of the strainers serves to prevent the base exchange material, which is in the form of tiny beads of synthetic resin, from being washed out of the tank by the flow of water therethrough, and the other serves to distribute incoming water radially outwardly into the tank interior.

The strainer units, which are identical, are more or less conventional to the extent that each comprises a hollow, cylindrical body 9 consisting of a stack of slightly spaced apart strainer members 10, and opposite end members 11 and 12 between which the cylindrical body 9 is axially confined as by means of a single bolt 13 having its shank 14 passing coaxially through the body to connect the opposite end members 11 and 12 together.

In the embodiment of the invention illustrated in FIGURES 1 through 4, one of the end members 12 comprises the end closure of the tank 8 and carries the strainer unit. The other end member 11 is a disc having a central hole therethrough to receive the shank 14 of the bolt 13.

The tank closure member 12 has a central hole therethrough which provides one of the tank ports 6 or 7, and a spider-like bridge piece 16 on the closure member, spanning the hole beneath the strainer unit, has a hub 17 formed thereon to receive the shank 14 of the bolt.

The head 18 of the bolt may be engaged with the outer axial end of the hub 17, as shown best in FIGURE 2, so that when a nut 19 is threaded on the free end of the bolt to bear against the outer face of the opposite end member 11, the two end members will be drawn together to clamp the cylindrical body 9 of the strainer therebetween.

It is a feature of this invention that the body 9 of the strainer is comprised of a stack of strainer members 10 which are in the form of identical, thin rings preferably, though not necessarily, molded of a suitable plastic material. These rings are maintained coaxial with one another and with the end members in a unique manner now about to be described.

Figure 4:
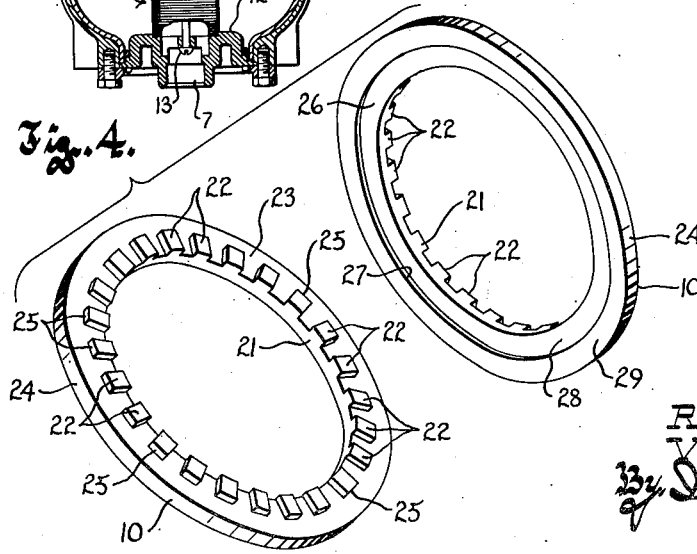
FIGURE 4 is a group perspective view of two adjacent rings illustrating the means thereon which cooperates to interlock the rings against lateral shifting out of coaxial relation.

As seen best in FIGURES 3 and 4, each of the rings has an internal diameter which is substantially larger than the diameter of the bolt shank 14, so that its inner edge 21 will be widely radially spaced from the bolt. Thus, no portion of any of the rings has anything resembling a hub such as was relied upon heretofore in strainers of the stacked disc type, to lock the discs to a central clamping bolt, coaxial therewith.

According to this invention, each ring has a multiplicity of small tooth-like pads 22 integrally formed therewith and projecting from its upper face 23, which is otherwise flat and normal to the ring axis. The pads 22 are circumferentially equispaced along the inner peripheral portion of the ring, and project upwardly a uniform distance from the upper face 23 of the ring, equal to about one-half the thickness of the ring at its periphery. The pads, which have flat tops that lie in a common plane parallel to the upper face of the ring, are adapted to engage the underside of an adjacent ring to hold the two rings spaced apart a slight but uniform distance. It will also be observed that the radially outer ends of the pads 22 are spaced a uniform distance from the periphery 24 of the ring and provide shoulders 25 located about one-half the distance between the inner and outer edges of the ring.

The other face of each ring is provided with a shallow annular recess 26 in the inner marginal portion thereof to receive the circle of pads on the ring therebeneath. This recess defines an annular inwardly facing shoulder 27 which is concentric to the ring axis and is located substantially halfway between the inner and outer edges of the ring, so as to closely encircle and oppose the pads 22 on a ring therebeneath.

Hence, the nesting of the circle of pads on each ring in the recess of a ring thereabove serves to more or less interlock all of the rings in the stack thereof against relative flatwise shifting and to hold them coaxial. The pads of each ring, of course, engage the bottoms 28 of the recess in adjacent rings to hold the rings slightly but uniformly axially spaced apart in the stack thereof.

The spacing between rings, of course, depends upon the height of the pads 22 and, consequently, the efficacy of the strainer can be predetermined by varying the height of the pads.

The lower face 29 of each of the rings, outwardly of the recess therein, is preferably slightly concave or frustoconical so that the ring gradually decreases in thickness inwardly from its periphery toward the annular shoulder 27 thereon. This concavity or taper on the underside of each of the rings is important to the operation of the unit as a strainer, since it minimizes clogging of the unit at its entry, namely, the circumferentially extending slit-like spaces between the rings at their peripheries. These slit-like entry ports are defined by sharp edges at the peripheries of the rings, where the rings have minimum spacing, so that liquid entrained tiny solid particles of a size that can pass radially inwardly past the peripheries of the rings will have no tendency to become lodged in the space between the rings, but will pass freely into the interior of the strainer body. Larger particles of solid material, of course, will be excluded from the space between the rings, thus making the strainer as free from clogging as possible.

As stated, the reception of the circular rows of pads 22 in the annular recesses of adjacent rings interlocks all of the rings in the stack and holds them coaxial with one another. The end disc 11 at the top of the stack of rings also has a recess 30 therein identical to the recesses in the undersides of the rings, and in which the pads 22 on the topmost ring of the stack nest to hold the end member 11 coaxial with the stack of rings. The opposite end member 12 also may be provided with a shallow counterbore or recess 31 to receive and embrace the entire lowermost ring, as seen best in FIGURE 2, so as to preclude slipping of the stack of rings side-wise out of coaxial relation with respect to the clamping bolt 13, which holds the stack of rings assembled between the end members 11 and 12. Alternatively, the end member 12 may have an annular boss 32, as is the case with the end member 12' shown in FIGURE 5, to nest within the recess 26 in the underside of the lowermost ring of the stack.

Figure 5:
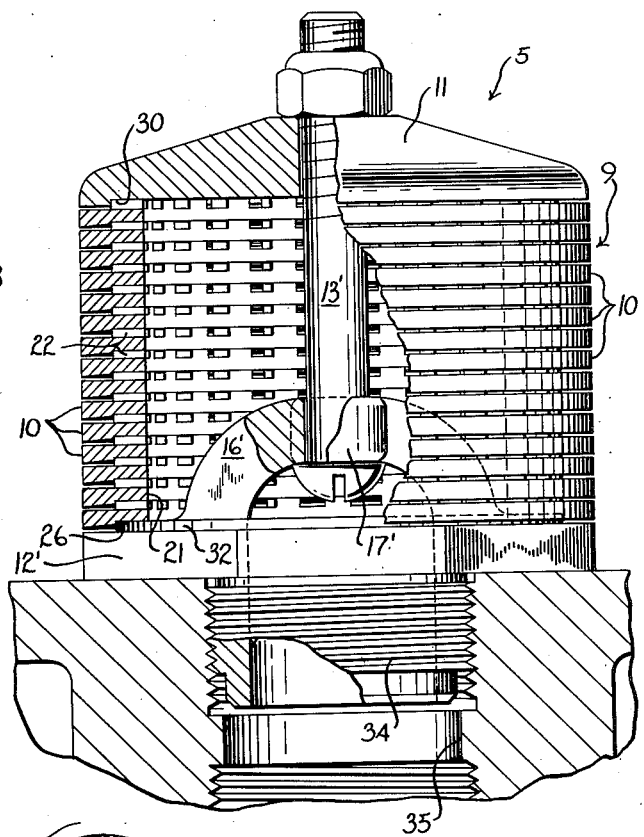
FIGURE 5 is a view similar to FIGURE 2, but showing a slightly modified embodiment of the invention.

The strainer unit disclosed in FIGURES 1 through 4 is adapted to form a subassembly with the end closure 12 of a tank, such as the water softener tank 8 shown in FIGURE 1. In FIGURE 5, however, the strainer is a unit apart from any of the components of a tank, or the like. It has an end member 11, like that previously described, at one end of the strainer body, and a separate end member 12' of hexagonal shape which is, in all respects, equivalent to the end member 12 heretofore described but constitutes a part of the strainer unit itself. The end member 12' has an externally threaded port defining nipple 34 thereon projecting from its outer face to enable the filter unit to be screwed into a port 35 of a tank, or the like. In this case also, the bridge piece 16' on the end member 12' arches upwardly into the interior of the filter body, and across the port so as not to obstruct the same, and it also has a hub 17' formed in its medial portion to receive the shank of the clamping screw 13'.

It is important to note that with the constructions described, relative rotation between the various parts of the strainer unit is not only permissible, but intended and advantageous. In this respect, the interlocking connections between the rings themselves and between the end members 11 and 12 and the endmost rings of the stack thereof serve to constrain the rings and end members to rotation relative to one another about the common axis of the rings. Hence, even though the bolt 13 may be holding the stack of rings quite firmly clamped together between the end members, the rings, the end disc 11 and, in fact, the bolt 13 with the nut 19 thereon may all be rotated relative to the tank closure member 12, or member 12', by anyone unfamiliar with the installation attempting to remove the strainer unit from its position within a tank, or the like.

This prevents more or less unintentional disassembly of the stack of rings in the tank by persons unfamiliar with the installation, as frequently occurred with past strainers having discs which were interlocked against rotation relative to one another and to the end members, or where the nut 19 could be backed off the bolt 13 without holding its shank against rotation with it as by means of a tool applied to the head of the bolt. At such times, the stack of disassembled discs spewed out over the interior of the tank at its bottom, and it was a difficult and time-consuming task to retrieve them for reassembly in the strainer unit.

The strainer unit of FIGURES 1–4 can best be disassembled after the end closure member 12 has been first removed from the tank. Thereafter, the head of the bolt may be held against rotation, as by a screw driver inserted into the port in the end member 12, while a wrench is applied to the nut 19 to back it off of the bolt shank.

The strainer unit of FIGURE 5 can only be disassembled by applying torque to the end member 12' in the direction to back its nipple out of a threaded hole in which it may be engaged. That is the reason the member 12' has a hexagonal shape, making it easier to fit a wrench thereto. After removal of the strainer as a unit in this manner, it may be disassembled in the same manner as that of FIGURES 1–4, namely, by inserting the blade of a screw driver through the nipple on the end 12' and into the slot in the head of the clamping bolt, and then backing off the nut on the other end of the bolt with a wrench.

From the foregoing description, taken together with the accompanying drawings, it will be readily apparent to those skilled in the art that this invention provides an improved strainer unit featuring a hollow body consisting of a stack of identical rings, each of which has means thereon to interlock with an adjacent ring to hold the stack thereof coaxial.

What we claim is:

A disc strainer characterized by:

A. a hollow strainer body comprising
  (1) a pair of spaced apart end members one of which has a flow port therein opening to the interior of the body,
  (2) means connecting the end members to hold them against separation, and
  (3) a stack of spaced apart substantially flat rings axially confined between the end members with all portions of the rings spaced a substantial distance from said connecting means;

B. interengaging means on the rings cooperating to hold the rings coaxial and slightly spaced apart, without interfering with rotation of the rings relative to one another about their common axis, comprising
  (1) integral circumferentially spaced pads on each of the rings, projecting a uniform distance toward one end of the stack from one face of the ring and into engagement with the opposing face of an adjacent ring to hold the rings in slightly spaced relation, said pads defining abutments located a uniform distance from and facing toward the outer edges of the rings, and being located remote from the peripheries of the rings so that the spaces between rings are uninterrupted at the peripheral portions of the rings and the spaces collectively define a second flow port opening to the interior of the body through the spaces between circumferentially adjacent pads,
  (2) and an annular recess in the other face of each ring, opening radially to the inner edge of the ring and axially toward the opposite end of the stack, the recesses in all but one end ring, of the stack receiving the pads on adjacent rings and defining annular shoulders which face toward the inner edges of the rings and intimately surround the pads in confronting relation to the abutments provided thereby so as to prevent the rings from shifting out of coaxial relation;

C. said other face of each ring being substantially concave with the ring increasing in thickness from the recess to the periphery of the ring so that the spaces between rings are smallest at their peripheries;

D. means on the end member adjacent to said one end ring rotatably received in the recess thereof and providing an annular abutment which faces radially outwardly and is interengaged with the shoulder on said end ring to prevent lateral shifting of the stack of rings relative to said last named end member;

E. and means on the end member at the other end of the stack defining an annular shoulder that intimately surrounds and confronts the abutments provided by the pads on the adjacent ring, but clears the remainder of said adjacent ring, to prevent lateral shifting of the stack of rings relative to said last named end member without interfering with rotation thereof relative to the rings of the stack.

References Cited in the file of this patent

FOREIGN PATENTS

| | | |
|---|---|---|
| 321,655 | France | May 31, 1902 |
| 530,853 | Belgium | Aug. 31, 1954 |